United States Patent [19]

Egashira

[11] 4,310,281

[45] Jan. 12, 1982

[54] PIPE NESTING AND DENESTING APPARATUS

[76] Inventor: Hiroji Egashira, 6-24, 6 chome, Shinmachi, Hoya-city, Tokyo, Japan

[21] Appl. No.: 164,792

[22] Filed: Jun. 30, 1980

[30] Foreign Application Priority Data

Jul. 11, 1979 [JP] Japan .................................. 54-86955

[51] Int. Cl.[3] ......................... B65G 7/10; B66F 11/00

[52] U.S. Cl. ...................................... 414/433; 33/286; 138/104; 414/745; 414/910

[58] Field of Search ............... 414/431, 433, 589, 590, 414/591, 745, 747, 910; 33/181 R, 1 H, 286, 412; 138/104; 410/47, 49

[56] References Cited

U.S. PATENT DOCUMENTS

| | | | |
|---|---|---|---|
| 1,583,486 | 5/1926 | Paige | 414/745 |
| 2,423,986 | 7/1947 | Lathrope | 138/113 X |
| 2,500,204 | 3/1950 | Ronay | 414/433 X |
| 3,008,439 | 11/1961 | Stanley | 414/433 |
| 4,049,043 | 9/1977 | Fort et al. | 414/431 X |
| 4,123,848 | 11/1978 | Emmerich et al. | 33/181 R X |
| 4,253,792 | 3/1981 | Nishikawa | 414/910 X |

FOREIGN PATENT DOCUMENTS

| | | | |
|---|---|---|---|
| 1924805 | 11/1970 | Fed. Rep. of Germany | 138/104 |

*Primary Examiner*—Leslie J. Paperner

*Attorney, Agent, or Firm*—Fisher, Gerhardt, Crampton & Groh

[57] ABSTRACT

A pipe nesting and denesting apparatus is efficiency in transportation of many pipes different in diameters, and said apparatus can operate in a short time nesting work without injuring pipes. Inside the rails of said apparatus, a receiving stand for receiving pipe which is movable up and down is provided, said pipe is moved by a supporting rod on a carriage, and pipes different in diameters are inserted or pulled up on an adjustable nesting stand.

7 Claims, 11 Drawing Figures

PIPE NESTING AND DENESTING APPARATUS

BACKGROUND OF THE INVENTION

This invention relates to apparatuses by which pipes different in diameters are fitted or nested one inside another, beginning with one largest in diameter, into multiple pipes, or the multiple pipes are denested successively beginning with one smallest in diameter, in order to remarkably improve the transportation efficiency of pipes, and more particularly to a pipe nesting and denesting apparatus in which the axis of a pipe smaller in diameter which is to be nested or denested by a supporting rod fixedly mounted on a carriage is correctly aligned with the axis of a pipe larger in diameter which receives the pipe smaller in diameter, whereby the pipes are nested or denested in a period of time which is about a half or less of the period of time required for a conventional nesting and denesting apparatus.

In shipping a number of pipes such as steel pipes, cast iron pipes or asbestos pipe, they are coaxially fitted (or nested) one inside another in advance. In unloading the pipes from boats or at truck terminals, they are denested, and only pipes having diameters requested are transported to the respective working site. This is undoubtedly economical and effective in transportation efficiency.

A pipe nesting apparatus has been known in the art for a long time. In a typical example of the conventional pipe nesting apparatus, a horizontal supporting rod for supporting a pipe is provided on a carriage on rails in such a manner that its height is adjustable as desired, a V-shaped receiving stand for receiving a pipe in the axial direction of the rails from and delivering to a fork lift is disposed between the rails at a position forwardly of the carriage in such a manner that it can be retracted from the rails when required, and a V-shaped nesting stand is fixedly mounted on the rails in front of the receiving stand. The carriage is run toward the pipe on the receiving stand while the supporting rod is being adjustably moved up or down by an operating stand provided on the side wall of the carriage, so that the supporting rod is inserted into the pipe on the receiving stand. Thereafter, the supporting rod is lifted to support the pipe. Then, the receiving stand is retracted from the rails to place it on the V-shaped nesting stand. This operated is repeatedly carried out to nesting pipes one inside another to obtain multiple pipes.

Spacers are inserted between the multiple pipes thus obtained so that they may not be damaged by vibrations or impacts or cargo crumbling which may occur during the transportation. In general, the spacers are fixedly inserted into the pipes manually after being fixedly secured to a belt at equal intervals, during the nesting operation. Therefore, in the multiple pipes, the axes of the outermost pipe and the remaining pipes which have been inserted one inside another, i.e. the axes of the pipes are not always in alignment with one another, and at worst the axes of the pipes are gradually deviated from one another.

With the above-described pipe nesting apparatus, it is extremely difficult to correctly adjust the axis of the outermost pipe. Therefore, in nesting two pipes for instance, one of the pipes must be loosely fitted inside the other; that is, in the operation, the difference in radius between the two pipes must be more than 100 mm. Thus, the number of pipes to be nested is limited. In association with this, bulky spacers of the order of 98 to 100 mm in thickness must be employed.

In addition, with the conventional apparatus, while a pipe smaller in diameter is inserted into a pipe larger in diameter, the end of the former may be struck against the inner wall of the latter to peel off the corrosionresisting coating, or the former may fatally damage the latter to the extend that the latter cannot be used. In the latter case, it may be impossible to insert the smaller diameter pipe into the larger diameter pipe, and accordingly it may be necessary to repeat the nesting operation all over again by retracting the carriage with the pipe.

Furthermore, in denesting the multiple pipes beginning with the innermost pipe, it takes a relatively long time, great skill and intricate steps to pull out the innermost pipe, because a method is not employed in which the axis of the pipe on the nesting stand is made in alignment with the axis of the supporting rod.

SUMMARY OF THE INVENTION

Accordingly, a first object of this invention is to provide a pipe nesting and denesting apparatus, in which a pipe receiving stand for receiving a pipe which is delivered to and removed away from the apparatus by a fork lift is movable vertically so that a supporting rod is inserted into the pipe, the supporting rod being cantilevered, at the base, to a carriage, and nesting stands supporting a pipe larger in diameter into which the firstly mentioned pipe is inserted by being held and forwarded at the same level operates make the axes of the two pipes in alignment with each other.

A second object of the invention is to provide a pipe nesting and denesting apparatus, in which rails are arranged on base frames horizontally and linearly, and the axial direction of a supporting rod on a carriage and the pipe supporting directions of a receiving stand and of nesting stands are made in alignment with one another.

A third object of the invention is to provide a pipe nesting and denesting apparatus, in which a receiving stand is so designed that its stand plate is retracted below before a carriage passes the receiving stand and the stand plate is lifted when the supporting rod of the carriage is inserted into a pipe on the receiving stand.

A fourth object of the invention is to provide a pipe nesting and denesting apparatus in which one or both of the stand plates of a pair of nesting stands which are disposed in the axial line of a supporting rod are moved vertically to desired positions.

A fifth object of the invention is to provide a pipe nesting and denesting apparatus in which a roller frame having a pair of rollers and provided on the stand plate of each nesting stand is movable a desired distance in a direction perpendicular to the axial direction of a supporting rod.

A sixth object of the invention is to provide a pipe nesting and denesting apparatus in which one of the two rollers on each nesting stand is rotated to turn a pipe thereon so as to align the axis of the pipe with a vertical plane along the axis of a supporting rod.

A seventh object of the invention is to provide a pipe nesting and denesting apparatus in which an operator on an operating stand provided beside a nesting stand and in the axial direction of the nesting stand collimates the axis of a supporting rod and the axis of a pipe supported on the supporting rod to detect the difference between the two axes thereby to adjust the nesting stand.

An eighth object of the invention is to provide a pipe nesting and denesting apparatus in which a transparent panel is provided at the front of an operating stand, and an operator on the operating stand collimates aligning lines provided on the transparent panel and the axis of a pipe on nesting stands to correct the axis of the pipe, whereby a number of pipes can be quickly and positively nested.

The foregoing objects and other objects of the invention will become more apparent from the following detailed description when read in conjunction with the accompanying drawings.

DETAILED DESCRIPTION OF THE INVENTION

Figure 1:
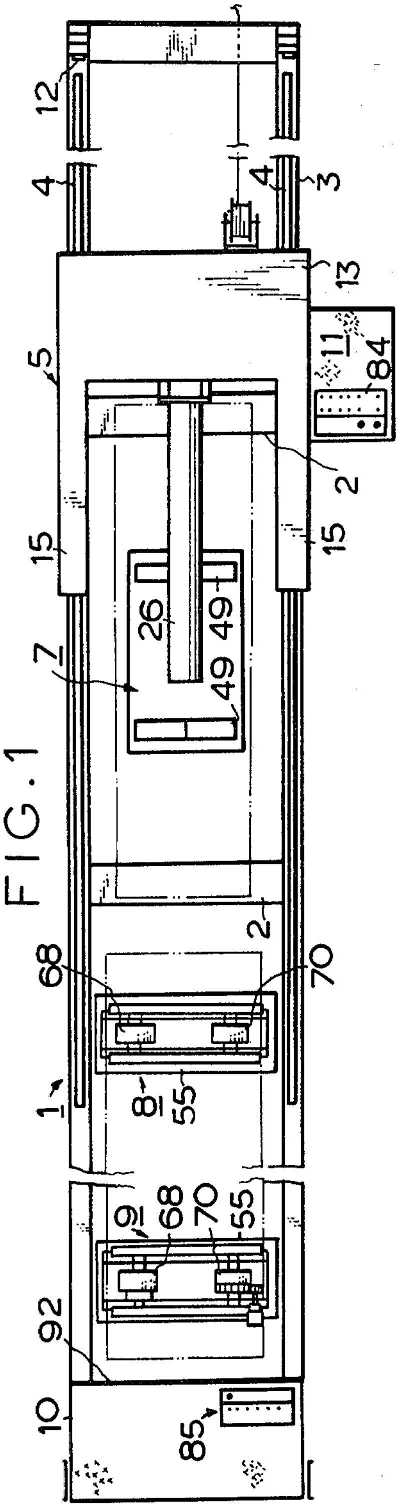
FIGS. 1 and 2 are a plan view and a side view showing a pipe nesting and denesting apparatus according to this invention, respectively.
Figure 2:
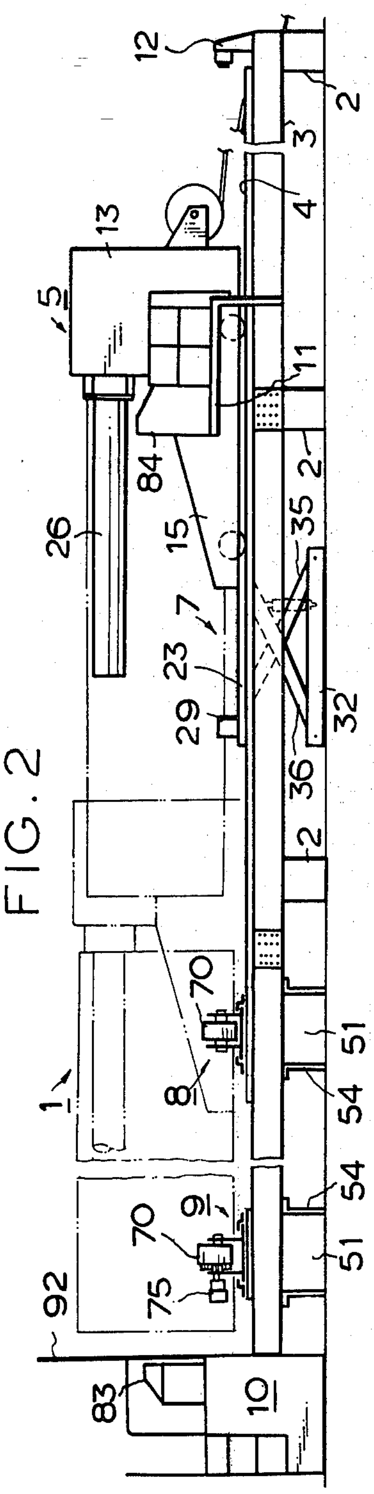

One preferred example of a pipe nesting and denesting apparatus according to this invention is indicated generally by reference numeral 1 in the accompanying drawings. The foundation of the apparatus 1 is firmly fixed with cement. The apparatus 1 has base frames 2 made of steel members which are arranged in the form of box-shaped sleepers at suitable intervals as shown in FIGS. 1 and 2. A pair of beam frames 3 are fixedly mounted on the base frames 2 in such a manner that they are laid horizontally and in parallel with each other with a predetermined distance therebetween and they extend perpendicularly to the base frames 2, so that a pair of rails 4 are laid on the beam frames 3. The beam frames 3 are I-shaped steel members having a predetermined length. Instead of the beam frames 3 and rails 4, channel steel members may be mounted in spaced relation on the base frames 2. In this case, the wheels of a carriage (described later) can be fitted in the channel steel members, and therefore the carriage can be made light in weight and simple in construction.

The carriage 5 is set on the rails 4 in such a manner that it can go freely back and forth. A receiving stand 7 is brought to and left from the apparatus by a fork lift (not shown). The receiving stand 7 is movable up and down and is placed between the rails 4. A pair of nesting stands 8 are fixedly provided longitudinally of the rails and between the rails, with a distance corresponding to the width of the fork lift therebetween, at one side of the receiving stand 7. An operating stand 10 for operating the nesting stands is provide outside the rails 4 of the nesting stands.

Figure 3:
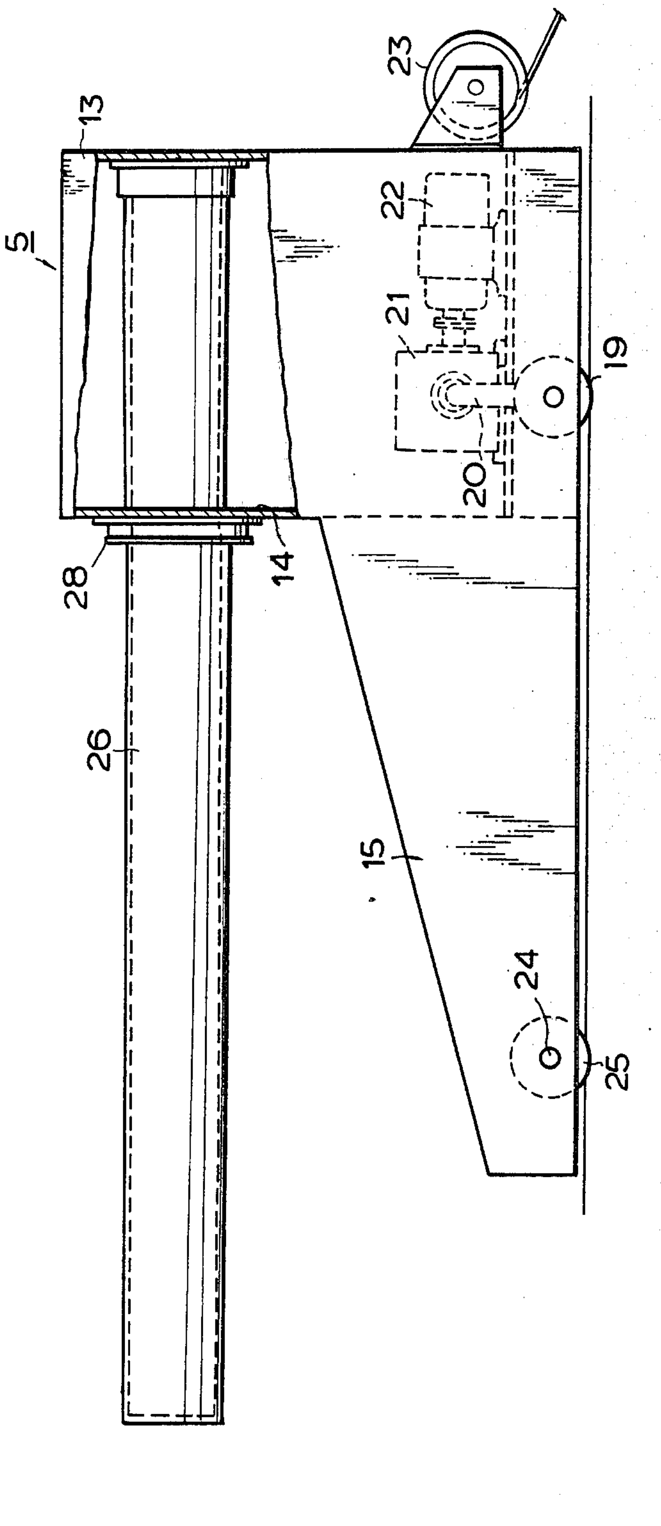
FIG. 3 is an enlarged side view showing a carriage shown in FIGS. 1 and 2.
Figure 4:
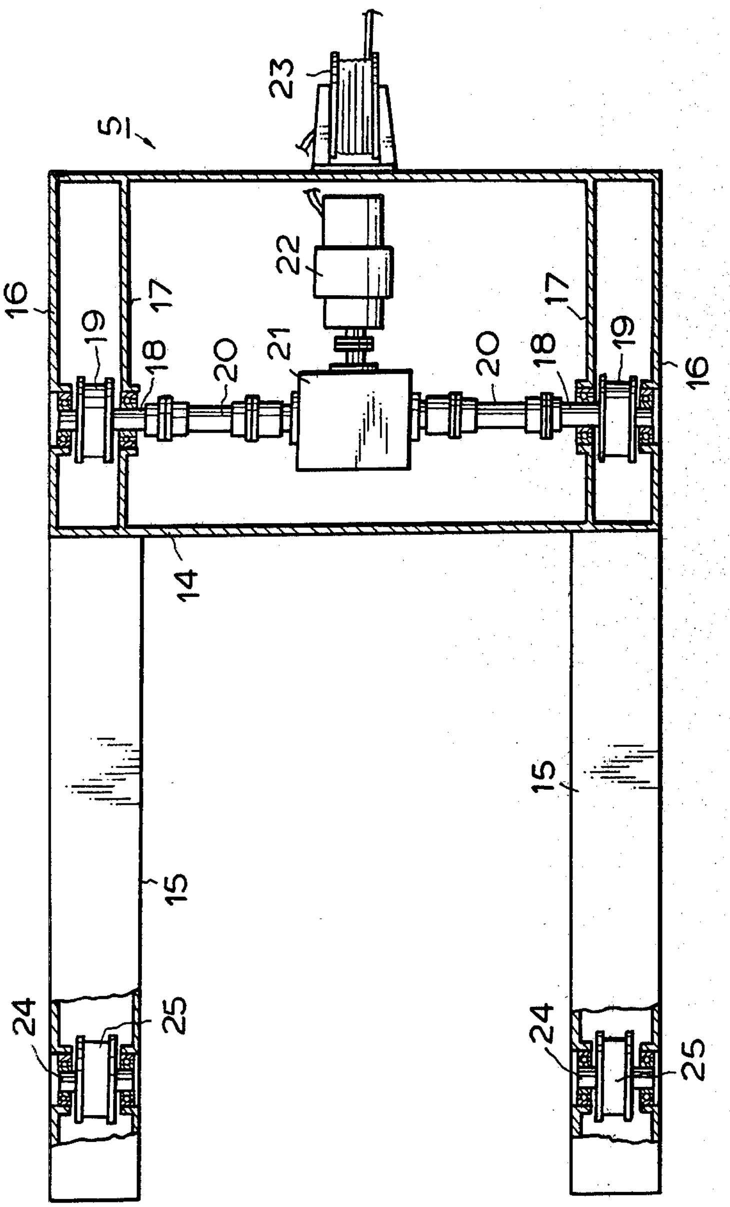
FIG. 4 is a plan view of the carriage in FIG. 3, whose housing is cut partially to show the internal construction.
Figure 6:
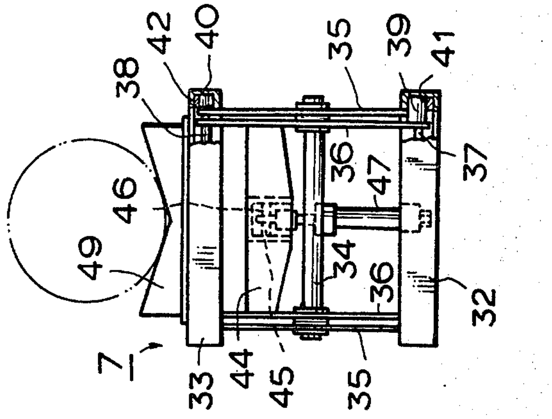
FIG. 6 is a front view of a receiving stand in FIGS. 1 and 2.
Figure 5:
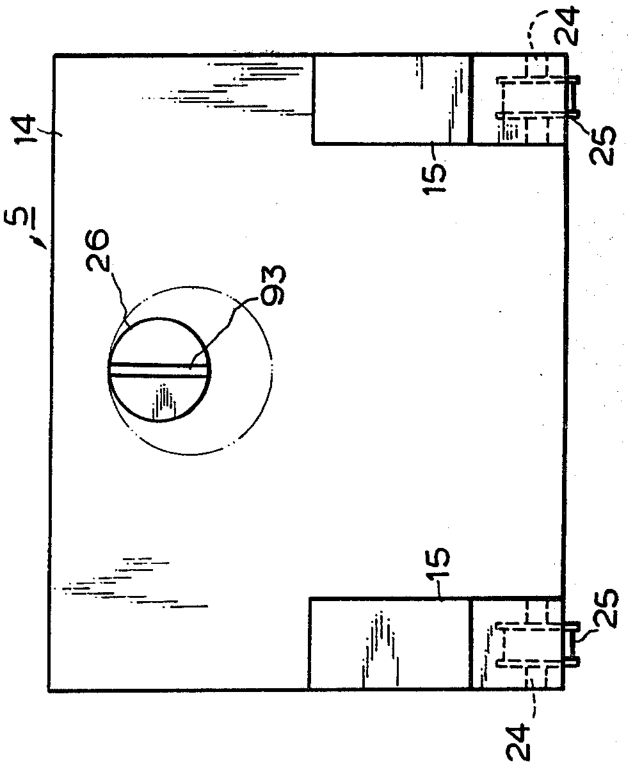
FIG. 5 is a front view of the carriage in FIGS. 3 and 4.

The carriage 5, as shown in FIGS. 3, 4 and 5, comprises a substantially rectangular parallele piped housing 13. Driving wheels 19 mounted on shafts 18 are supported through bearings by the lower portions of the two side walls 16 the housing 13 and the two inner supporting walls 17, respectively. The inner end portion of each of the shafts 18 is coupled to a reduction gear, or a miter gear 21, through an outer universal joint, a coupling shaft 20 and an inner univeral joint. The inner end of the coupling shaft 20 is held higher than the outer end by the universal joints. The output shaft of an electric motor 22 is connected to the reduction gear 21. An electric cord for energizing the electric motor 22 is extended through the housing 13, and is wound on a cord winding drum 23 which is maintained energized to wind the cord, and is connected to the power source through the rails.

Leg members 15 are extended forwardly from the lower portions of both sides of the front wall 14 of the housing 13. Provided at the end portion of each leg member 15 is a wheel 25 which is fixedly mounted on its shaft 24. The provision of the wheels 25 makes it possible to stably run the carriage on which load, which is a pipe in this case, is applied.

A supporting rod 26 in the form of a pipe is connected, at the base, to the center of the upper portion of the rear wall of the housing 13. The supporting rod 26 is extended forwardly through the front wall 14 in such a manner that it is horizontal and in parallel with the rails. The supporting rod 26 is relatively heavy in wall thickness. A shock absorbing ring 28 is provided on the front wall 14 in such a manner that it surrounds the supporting rod 26, so as to absorb an impact which may be applied to the supporting rod by pipes to be held.

An auxiliary operating stand 11 is provided on one side wall of the carriage 5. The operating stand 11 operates to run the carriage 5 and to lift the receiving stand 7. A stopper 12 is fixedly secured to the rear ends of the rails so that the carriage 5 being moved backwardly by the operating stand 11 may not run off the rails.

The above-described receiving stand 7 has a substantially rectangular parallelepiped base plate 32 which is fixedly embedded in a concrete fundation. The base plate 32 is made of channel steel members and thick steel plates. Provided above the base plate 32 is a stand plate 33 which is similar in configuration to the base plate 32. The receiving stand 7 further comprises a pair of supports 35 and 36 on each side. The supports 35 and 36 are crossed at the center; more specifically, the central portions of the supports 35 and 36 are pivotally mounted on one end of a center shaft 34, respectively. Thus, the stand plate 33 is supported by the supports 35 and 36 in such a manner that the stand plate 33 can be freely moved up and down. The right end portions of the supports 35 and 36 are rotatably coupled to the supporting shafts 37 and 38 which are embedded in the stand plate 36 and the base plate 32, respectively. On the other hand, the left end portions of the supports 35 and 36 are provided with rollers 40 and 39, respectively. The rollers 39 and 40 slide along guide plates 41 and 42, respectively.

A beam member 44 made of a channel bar is fixedly secured to the two supports 36 and 36 in such a manner the channel faces downwardly. The upper end portion of a hydraulic cylinder 47 whose lower end portion is pivotally mounted on the base plate 32 is pivotally secured to the supporting shaft 46 which is extended between mounting members 45 provided at the central portion of the beam member 44.

A pair of V-shaped frames 49 are fixedly mounted on the stand plate 32, with a distance corresponding to the insertion width of the fork lift therebetween, so that a pipe can be laid on the V-shaped frames 49 in parallel with the rails.

In order that, in loading a pipe with the fork lift, the receiving stand 7 is positioned so that the standard pipe supporting rod 26 can be inserted thereinto, the hydraulic cylinder 47 is operated to adjust the height of the stand plate 33, or to lift the stand plate 33 to a position where the supporting rod 26 can be inserted after the pipe has been loaded. After the supporting rod 26 has been inserted into the pipe, the V-shaped frames 29 are lowered to a position below the rails, and thereafter the carriage 5 holding the pipe is forwarded to the nesting stands.

Figure 8:
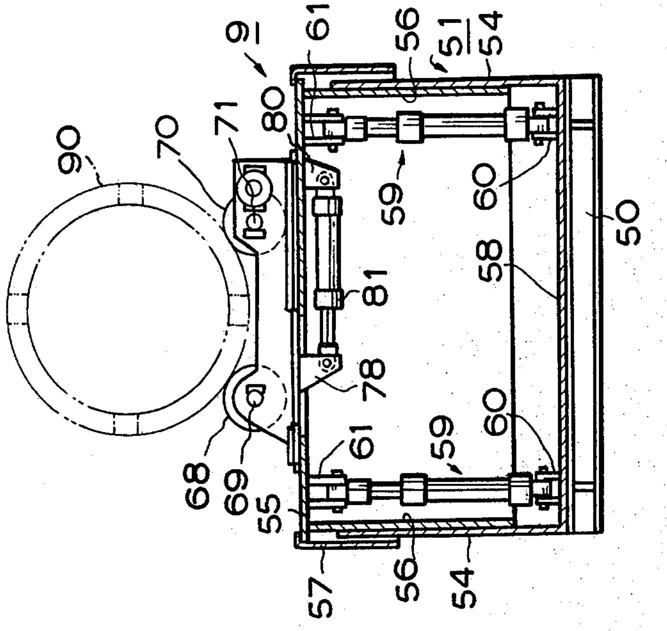
FIG. 8 is a longitudinal sectional view of a nesting stand in FIGS. 1 and 2.
Figure 7:
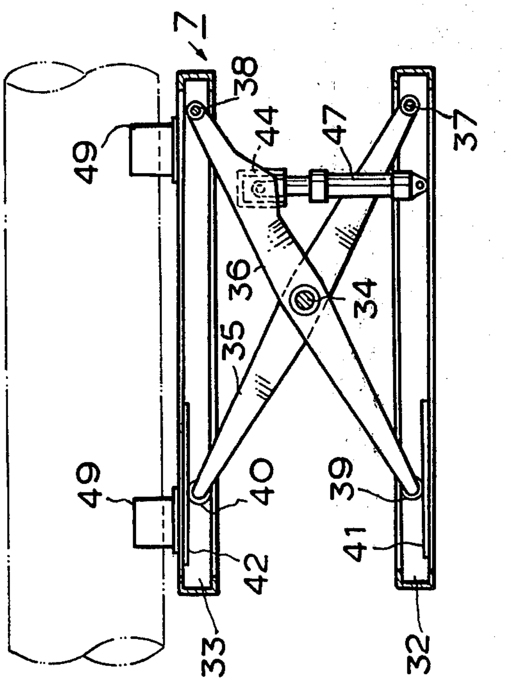
FIG. 7 is a side view of the receiving stand in FIG. 6.
Figure 9:
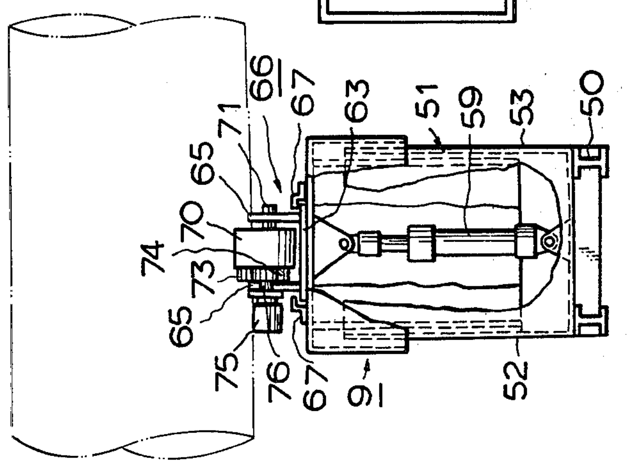
FIG. 9 is a cross sectional view of the nesting stand in FIG. 8.

The nesting stands 8 and 9 are similar in construction except that the nesting stand 9 has a roller drive mechanism as shown in FIGS. 8 and 9 in which like parts are designated by like reference numerals.

Each of the nesting stands 8 and 9 has a base frame 50 in the form of a rectangular parallelepiped which is made of I-shaped steel members; and a housing frame 51 which is provided on the base frame 50. The housing frame 51 is similar in plane configuration to the base frame 50 and is made of thick iron plates. The nesting stands may be fixedly secured to the beam frames 3 through mounting plates 54 inverted-L-shaped in section which are provided on the front and rear walls 52 and 53 of the housing frame 51. A stand plate 55 is provided on the housing frame 51 in such manner that it is freely movable up and down. The stand plate 55 is provided with a rectangular-cylinder-shaped guide board 56 which is movable along the inner surface of the housing frame 51, and a rectangular-cylinder-shaped sleeve 57 which is movable along the outer surface of the housing frame 51.

A pair of hydraulic cylinders 59 are provided on both end portions of the bottom plate of the nesting stand, respectively. More specifically, the lower end portions of the hydraulic cylinders 59 are pivotally coupled to mounting members 60 on the two end portions of the bottom plate of the nesting stand, and the upper end portions of the rods of the hydraulic cylinders 59 are pivotally coupled to mounting members 61 which are provided at positions on the stand plate 55 which are right above the two end portions of the bottom plate.

A roller frame 66 having a horizontal plate member 63 is provided on the upper surface of the stand plate 55. The horizontal plate member 63 is arranged in such a manner as to be slidable perpendicularly to the axial direction of the apparatus with the aid of guide members 67 which are provided on both sides of the horizontal plate member 63. The roller frame 66 further has a pair of side plates 65 which are opposed in parallel spaced relation to each other on the top of the horizontal plate member 63.

Figure 10:
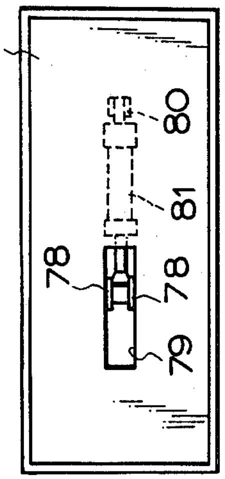
FIG. 10 is a plan view of a slit formed in a stand plate of the nesting stand shown in FIGS. 8 and 9.

The horizontal plate member 63 of the roller frame, as shown in FIGS. 8 and 10, has a mounting member 78 secured to the lower surface of the horizontal plate member 63. The mounting member 78 is protruded downwardly through a slit 79 in the stand plate 55. Both ends of a hydraulic cylinder 81 are pivotally coupled to the mounting member 78 and another mounting member 80 secured to the lower surface of the stand plate. By means of this hydraulic cylinder 81, the roller frame 66 is slidably moved as desired in a direction perpendicular to the axial line of the rails 4.

A roller 68 is rotatably mounted on a supporting shaft extended between the side plates 65 at one end of the roller frame 66. Similarly, a drive roller 70 is fixedly secured to a supporting shaft 71 which is rotatably supported by the side plates 65 at the opposite end of the roller frame 66. A gear 73 is fixedly mounted on the supporting shaft 71. A hydraulic motor 75 is provided outside one of the side plates 65. The output shaft 76 of the motor 75 is extended through the side plate 65, and a pinion 74 is fixedly mounted on the end portion of the output shaft 76. The pinion 74 is engaged with the aforementioned gear 73, thus forming a roller driving mechanism by which the drive roller can be rotated as much as desired.

As the drive rollers 70 of the nesting stands are rotated, the multiple pipes placed on the rollers of the nesting stands 8 and 9 are rotated. This operation is carried out for the following purpose. In general, the axis of the inside pipe which has been inserted into the outside pipe with a spacer therebetween is deviated from the axis of the outside pipe, and is not in alignment with the axis of the supporting rod 26. Accordingly, it is necessary to make a vertical plane along the axis of the inside pipe parallel with a vertical plane along the axis of the supporting rod 26.

The aforementioned operating stand 10 is provided outside the ends of the beam frames 3 and at the left-handed side of the nesting stand 9, in such a manner that it is integral with the ends of the beam frames 3. The essential function of the operating stand 10 is to control the nesting stands 8 and 9; however, the operating stand 10 can operate the receiving stand 7 and the carriage 5 also. For this purpose, the operating stand 10 is provided with a housing accommodating an electrical circuit and an electrical control board 84.

Another electrical control board 84 is provided on the side wall of the carriage 5 for the operating stand 11. This is to auxiliarily operate the carriage 5 and the receiving stand 7 when it is required to operate the apparatus in its entirety extremely quickly.

In the case where pipes different in diameters are fitted (nested) one inside another beginning with one largest in diameter, the apparatus according to the invention is operated as follows:

First, a pipe largest in diameter, i.e. an outermost pipe 90, is carried over to the receiving stand 7 from the pipe storage area by the fork lift and is placed on the receiving stand 7. Thereafter, the receiving stand 7 is lifted to a position according to the diameter of the outermost pipe 90 by operating the relevant button on the control board. Then, the carriage 5 which has stayed at the rear end region of the rails 4 is moved toward the pipe 90 so that the supporting rod 26 is inserted into the pipe 90. Upon competion of the insertion of the supporting rod 26, the receiving stand 7 is lowered to a predetermined position below the rails 4, and then the carriage 5 is further moved on to the nesting stands 8 and 9. The stand plates 55 of the nesting stands 8 and 9, where the rollers 68 and 70 are disposed at the standard positions, are simultaneously raised to receive the outermost pipe 90 from the carriage 5.

Thereafter, the nesting stands 8 and 9 adjust their heights to control the posture of the outermost pipe 90, in order to receive the next pipe.

Figure 11:
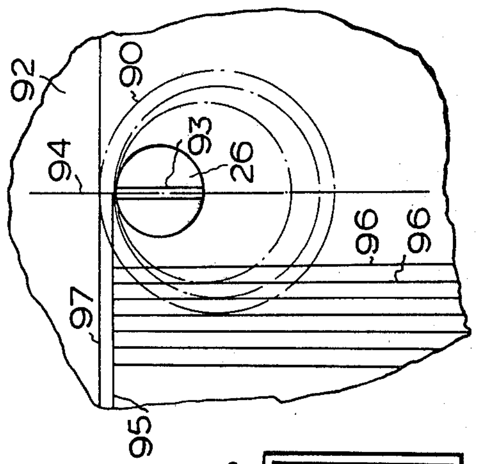
FIG. 11 is an enlarged view of a part of a transparent panel provided on an operating stand.

When pipes are nested one inside another, a spacer is inserted therebetween. Therefore, the axes of the pipes thus nested are not in alignment with one another. In order to correct this, a pipe posture controlling means as shown in FIG. 11 is provided. That is, the means is a transparent panel 92 provided vertically on the operating stand. The transparent panel 92 has a reference vertical line which is in alignment with the index 93 on the front end face of the supporting rod 26 when the operator observes the index 93 through the transparent panel 92; and a reference horizontal line 95 passing through the upper end point of the index 93 (corresponding to the support position of a pipe supported on the supporting rod). The transparent panel further has aligning lines 96, 96', 96'' . . . provided at intervals corresponding to the standard raii of pipes to be nested and to the left-handed side of the reference vertical line 94; and an aligning line 97 about 50 mm above the reference horizontal line 95.

The use of the transparent panel 92 thus constructed makes it possible that the axes of pipes to be nested are in alignment with one another with respect to the circumferences thereof. Accordingly, the pipes can be fitted one inside another with a suitable clearance therebetween. That is, if it is assumed that first and second pipes should be nested so that the second pipe is inserted into the first pipe, the second pipe can be placed inside the first pipe without contacting, and accordingly damaging, the inner wall of the first pipe, with the aid of the transparent panel 92 with the various reference lines.

Heretofore, the difference between the diameters of pipes which can be nested according to a conventional method ranges from 200 mm to 300 mm. However, the employment of the transparent panel 92 which allows the operator to aim at pipes to be nested makes it possible to nest pipes the difference in diameter of which is of the order of 100 mm. In addition, the period of time required for nesting pipes can be reduced to about ⅓ of that required in the nesting operation according to conventional method.

In order to align the axis of a first pipe into which a second pipe should be inserted, the nesting stands 8 and 9 are adjusted as follows: First, in each of the nesting stands 8 and 9, first the roller frame 66 is returned to its central reference position and the drive roller 70 is rotated to turn the nested pipes, so that the inner circumferences of the front and rear openings of the first pipe are aligned, at the right side, with each other through collimation at an appropriate aligning line 96. Then, the roller frames 66 are moved to the right or left to align the first pipe with the predetermined aligning line 96 corresponding to the rated diameter of the first pipe. Thereafter, one or both of the nesting stands 8 and 9 are moved up or down to align the inner circumference of the front and rear openings of the first pipe, at the upper end, with the reference horizontal line 95 and then to slight move it toward the aligning line 97. Under this condition, the second pipe on the carriage 5 can be inserted into the first pipe by forwarding the carriage 5.

The aligning lines 96 and 97 are not limited to those shown in FIG. 11 only. That is, they may be provided on the right-handed portion or the lower portion of the transparent panel, or they may be circular ones, if the operator can achieve collimation with ease.

After the pipes have been nested as described above, the nesting stands are slightly moved vertically to insert spacers between the two pipes, whereupon the nesting work is accomplished. The multiple pipes thus obtained are fixed with fixing metal members and are then removed from the nesting stands 8 and 9 by the fork lift.

In denesting multiple pipes with the apparatus of the invention, first the multiple pipes are laid on the nesting stands 8 and 9 by the fork lift, and then the supporting rod of the carriage 5 is inserted into the multiple pipes while the axis of the innermost pipe is being collimated with the aligning lines 96 and 97. Thereafter, the aforementioned fixing metal members are removed and the upper spacers are also removed from the pipes. Then, the nesting stands 8 and 9 are slightly moved upwardly to remove the lower spacers. Under this condition, the carriage 5 is moved backwardly to pull out the innermost pipe and to put it above the receiving stand 7. The receiving stand 7 is moved upwardly to receive the pipe thus pulled out. Thereafter, the carriage 5 is further moved backwardly, and then the pipe is removed from the receiving stand 7 by the fork lift.

What is claimed is:

1. A pipe nesting and denesting apparatus comprising:

a pair of rails which are extended linearly and fixedly secured to base frames;

a carriage having a supporting rod, the base of which is fixedly secured to said carriage in such a manner that said supporting rod is extended horizontally and forwardly, at a predetermined level, in the axial direction of said rails;

a receiving stand whose height can be adjusted, said receiving stand being disposed at predetermined position between said rails so that said receiving stand can receive and support a pipe in the axial direction of said supporting rod;

a pair of nesting stands which are positioned with a predetermined distance therebetween in the axial direction of said supporting rod and forwardly of said receiving stand, each of said nesting stands having a stand plate whose height can be adjusted, a roller frame whose position can be adjusted in such a manner that said roller frame is slid perpendicularly to the axial direction of said supporting stand, said roller frame being provided on said stand plate, and a pair of rollers rotatably mounted on both end portions of said roller frame so as to support in the axial direction of said supporting rod a first pipe into which a second pipe is inserted or multiple pipes obtained by nesting pipes; and an operating stand disposed forwardly of said nesting stands, said operating stand allowing the axis of said second pipe supported on said supporting rod to be in alignment with the axis of said first pipe through an operator's visual collimation, said operating stand including means for electrically controlling means adapted to operate said stand plates, roller frames and rollers of said nesting stands.

2. An apparatus as claimed in claim 1, in which said carriage has a substantially rectangular parallelepiped housing forming said carriage, drive wheels provided at both end portions of the lower part of the rear wall of said housing, said drive wheels being driven by an electric motor, and leg members protruded forwardly from both end portions of the front wall of said housing, and in which said supporting rod being cantilevered at the center of the front wall of said housing.

3. An apparatus as claimed in claim 1, in which said receiving stand comprises: a link mechanism which is made up of one pair of crossed supporting members the cross centers of which are rotatably mounted on both end portions of a central supporting shaft, respectively, said link mechanism being mounted between a bottom plate and a stand plate of said receiving stand so that said stand plate is freely movable up and down; a hydraulic cylinder coupled to said link mechanism and said bottom plate; and a pair of frames having V-shaped upper surfaces arranged respectively at the front and rear end portions of said stand plate with a distance corresponding to the insertion width of a fork lift handling pipes to be nested or denested therebetween.

4. An apparatus as claimed in claim 1, in which each of said nesting stands comprises: a relatively flat and rectangular-cylinder-shaped housing; a stand plate having a sleeve which is slidable along the wall of said rectangular-cylinder-shaped housing; and hydraulic cylinders disposed between the bottom plate of said rectangular-cylinder-shaped housing and said stand plate of said nesting stand so that the height of said stand plate can be adjusted thereby.

5. An apparatus as claimed in claim 1, in which said roller frame on said stand plate of each of said nesting stand has a first mounting member on the lower surface thereof, said first mounting member protruded downwardly through a slit formed in said stand plate, and a hydraulic cylinder is interposed between said first mounting member and a second mounting member provided on the lower surface of said stand plate, so that the roller frame is movable perpendicularly to the axial direction of said supporting rod.

6. An apparatus as claimed in claim 1 or 4, in which each of said nesting stands comprises a hydraulic motor for driving one of said pair of rollers provided at both end portions of said roller frame, said hydraulic motor being positioned on the outer surface of the side wall of said roller frame, and a pinion on the output shaft of said hydraulic motor is engaged with a gear on the supporting shaft of said roller which is driven by said hydraulic motor.

7. An apparatus as claimed in claim 1, in which said operating stand is provided with a transparent panel at the front, said transparent panel having: a reference vertical line corresponding to the axis of said supporting rod; a reference horizontal line passing through a point corresponding to a line in parallel with the axis of the uppermost edge of the front end face of said supporting rod, and a plurality of aligning lines corresponding to the side ends of the standard diameters of said second pipes to be inserted into said first pipe, which are supported on said supporting rod, so that the axis of said first pipe can be visually collimated by an operator and the posture of said first pipe is corrected through said collimation.

* * * * *